US012662802B2

(12) United States Patent
Spoler et al.

(10) Patent No.: US 12,662,802 B2
(45) Date of Patent: Jun. 23, 2026

(54) DRINKING AND DOMESTIC WATER SYSTEM AND SHUT-OFF VALVE FOR THE SAME

(71) Applicant: Gebr. Kemper GmbH + Co.KG, Olpe (DE)

(72) Inventors: Thomas Spoler, Olpe (DE); Andreas Obst, Olpe (DE)

(73) Assignee: Gebr. Kemper GmbH + Co.KG, Olpe (DE)

( * ) Notice: Subject to any disclaimer, the term of this patent is extended or adjusted under 35 U.S.C. 154(b) by 0 days.

(21) Appl. No.: 18/829,453

(22) Filed: Sep. 10, 2024

(65) Prior Publication Data

US 2025/0084620 A1 Mar. 13, 2025

(51) Int. Cl.
| | |
|---|---|
| *E03B 7/04* | (2006.01) |
| *E03B 7/07* | (2006.01) |
| *E03B 7/09* | (2006.01) |
| *E03C 1/02* | (2006.01) |
| *F16K 11/085* | (2006.01) |

(52) U.S. Cl.
CPC ................ *E03B 7/075* (2013.01); *E03B 7/04* (2013.01); *E03B 7/045* (2013.01); *E03B 7/09* (2013.01); *E03C 1/023* (2013.01); *F16K 11/0853* (2013.01); *F16K 11/0856* (2013.01)

(58) Field of Classification Search
CPC . E03B 7/075; E03B 7/04; E03B 7/045; E03B 7/09; E03B 7/08; E03C 1/023; F16K 11/0856; F16K 11/0853
See application file for complete search history.

(56) References Cited

U.S. PATENT DOCUMENTS

| | | | | |
|---|---|---|---|---|
| 3,191,628 | A | * | 6/1965 | Kirkwood ........... F16K 11/0853 137/625.23 |
| 3,826,466 | A | * | 7/1974 | Scaglione ................. F16K 5/00 210/429 |
| 3,906,997 | A | * | 9/1975 | Scaglione ............... F16K 11/16 137/614.16 |
| 2019/0162320 | A1 | | 5/2019 | Hilgert et al. |

FOREIGN PATENT DOCUMENTS

| | | | |
|---|---|---|---|
| DE | 202020000955 | U1 | 7/2021 |
| EP | 2484839 | B1 | 4/2018 |
| GB | 2569652 | A | 6/2019 |
| WO | 8901600 | A2 | 2/1989 |

OTHER PUBLICATIONS

European Search Report Patent Application No. 24199111.6, dated Feb. 2, 2025.

* cited by examiner

*Primary Examiner* — Marina A Tietjen
(74) *Attorney, Agent, or Firm* — Lippes Mathias LLP

(57) ABSTRACT

A drinking and domestic water system with a transfer point (22) from the public water supply network, a line (2, 4) from which at least one ring main (10; 38, 40) branches off, wherein the ring main (10) branches off from the line (2, 4) via an outlet opening (14) and is led back into the line (2, 4) via an inlet opening (16), wherein a flow resistance element (36) is arranged in the line (2, 4) between the outlet opening (14) and the inlet opening (16), or wherein the ring main (38, 40) is led back into a circulation line (6) via the inlet opening (16). The present invention aims to provide such drinking and domestic water system, which is intended to simplify the shutting off of the ring main for functional tests, cleaning measures or maintenance purposes.

12 Claims, 9 Drawing Sheets

Figure 1:
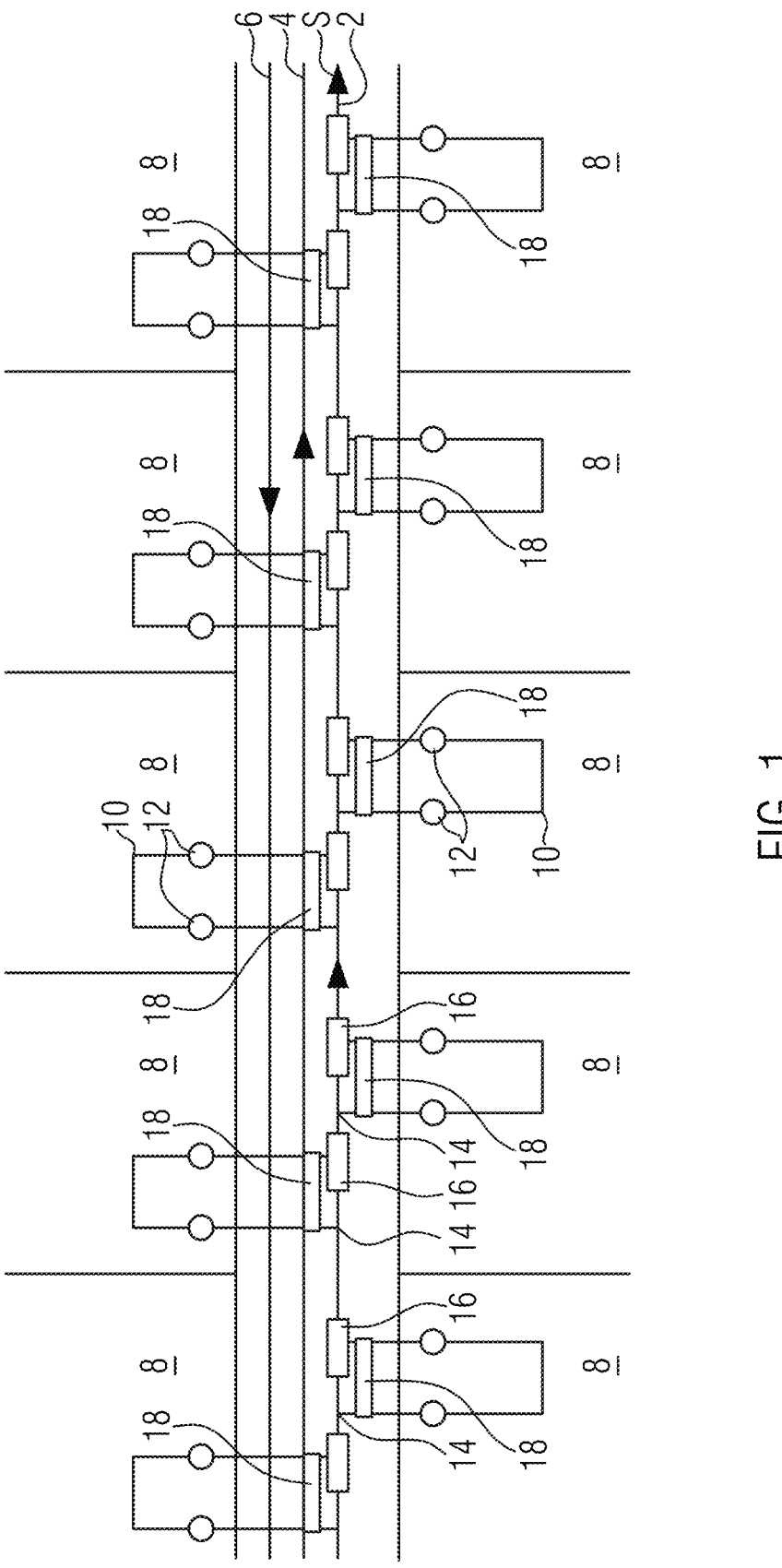

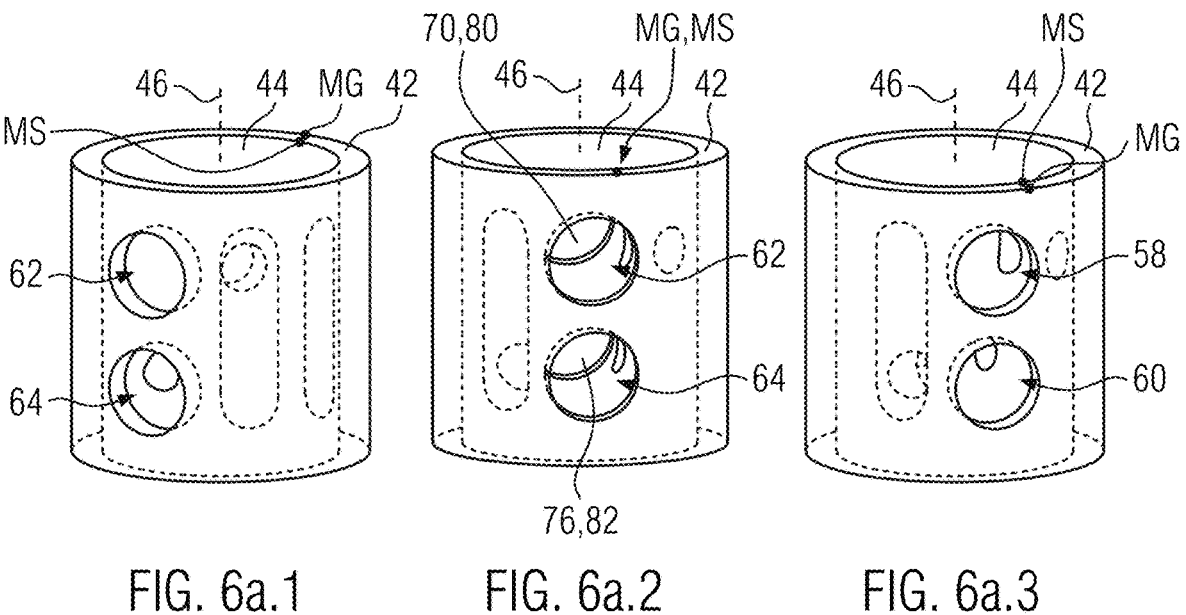
FIG. 6a.1          FIG. 6a.2          FIG. 6a.3
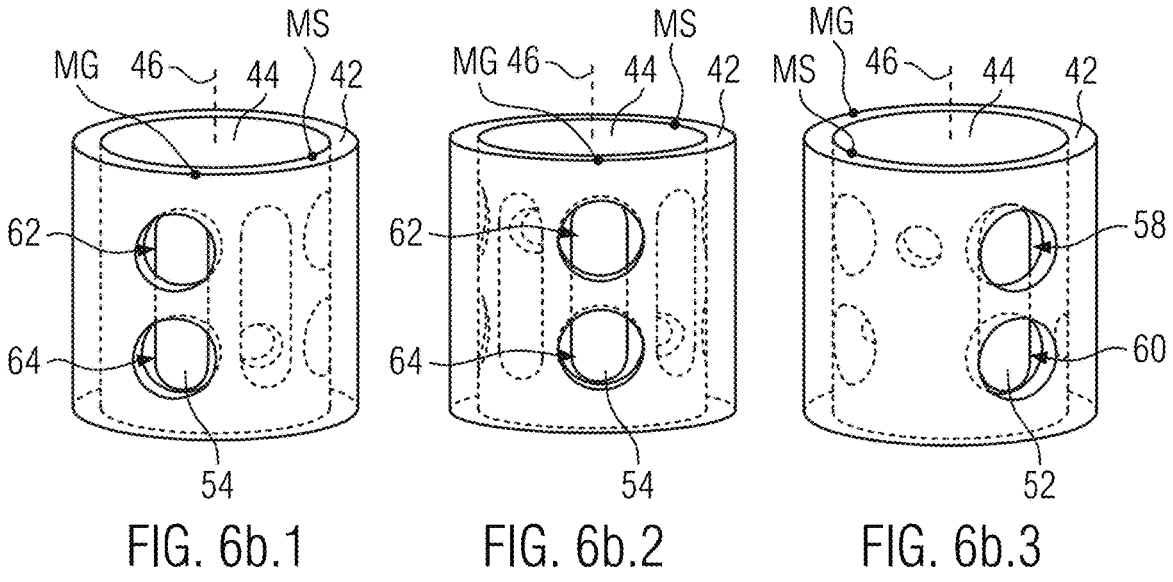
FIG. 6b.1          FIG. 6b.2          FIG. 6b.3

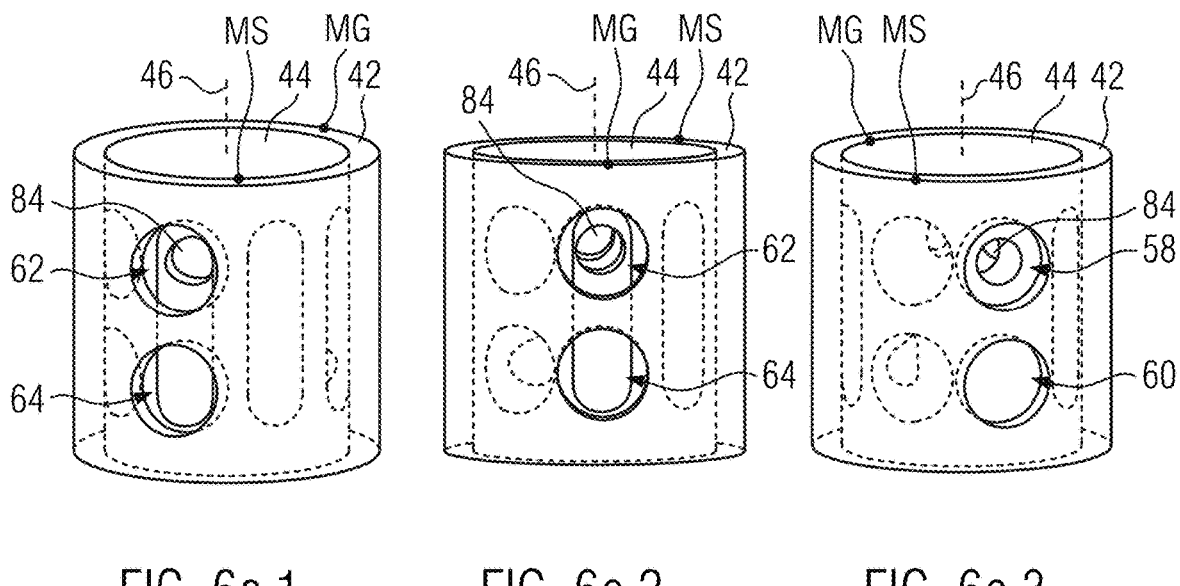
FIG. 6c.1        FIG. 6c.2        FIG. 6c.3
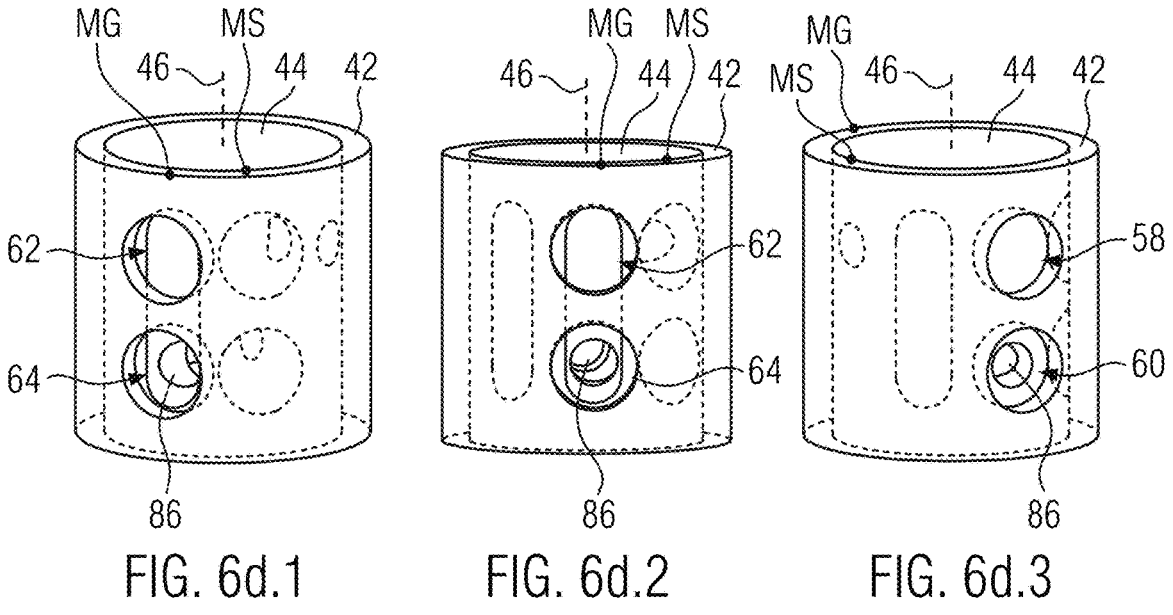
FIG. 6d.1        FIG. 6d.2        FIG. 6d.3

DRINKING AND DOMESTIC WATER SYSTEM AND SHUT-OFF VALVE FOR THE SAME

The present invention relates to a drinking and domestic water system with a transfer point from a public drinking water supply network and with at least one storey or rising pipe line and, as a rule, a plurality of pipes arranged one behind the other in the extension direction of the line and each leading to at least one tapping point, which branch off from the line.

A generic drinking and domestic water system is known, for example, from EP 1 845 702 A1.

Similar to the system according to the present invention, this previously known system is based on the idea that different consumers can be supplied via one line. The line is a storey or rising pipe line. The rising pipe line usually runs through several floors in a strictly straight line. The same applies to the storey line. This runs horizontally on one floor and supplies several wet rooms or flats in a row. In view of providing drinking and domestic water to one of the consumers with as little loss as possible, unnecessary deflections from the transfer point to the consumer are usually avoided. In this way, each of the lines is laid in as straight an alignment as possible. This enables the respective consumers to be supplied with a good line pressure. Thus, relatively high volume flows can be achieved at the respective consumer. With regard to drinking water hygiene, it is preferable to connect at least one consumer, preferably several consumers, for example in a wet room, via a ring main. This ring main leaves the line via an outlet opening and is returned to the line via an inlet opening. A flow resistance element is provided in the line between the inlet and outlet openings. This flow resistance element causes a certain flow through the ring main when water is drawn from a consumer provided downstream of the corresponding ring main. The flow resistance can create a Venturi effect at the inlet opening. The flow resistance element can also merely increase the flow resistance in the line to the extent that a certain partial flow flows through the considerably longer ring main, which therefore has a higher flow resistance than the section of the line between the outlet opening and the inlet opening. This means that when water is drawn from a consumer located downstream, water flows through the ring main parallel to the line and is therefore flushed.

The flow resistance element can be a statically configured flow resistance element, as is known, for example, from EP 1 845 702 A1. The flow resistance element can also be realized in a ring main flushing valve, which forms the inlet opening and the outlet opening as well as two openings for the line flow, which are usually opposite each other. The flow resistance element can also be a flow resistance element that dynamically adapts to the pressure conditions, as described in EP 2 167 740 A1. In this prior art, a full-flow shut-off valve is located directly adjacent to the outlet opening. Another full-flow shut-off valve is provided directly upstream of the outlet opening. The two shut-off valves can be used to shut off the ring main for maintenance purposes or during installation and disconnect it from the general distribution network of the drinking and domestic water system. The corresponding full-flow shut-off valves can also be used to test the function of the ring main.

Within the meaning of the present invention, ring mains can also be understood as a ring-shaped piping system in which a hot water supply line leads from an outlet opening of a hot water supply line to at least one consumer, usually to different consumers, which is led back via an inlet opening and connected via this to another line, which is referred to below as a circulation line. Such piping is usually implemented to supply a wet room with a hot water supply line laid inside the wet room and a hot water circulation line laid inside the wet room, into which the hot water supply line usually merges inside the wet room and which has a smaller nominal diameter than the hot water supply line.

The installation effort for these two shut-off valves is considerable. In addition, it is often not possible for the user to trace the respective valve position. Incorrect use of the shut-off valves can lead to insufficient flow or stagnation, particularly within the ring main. One of the shut-off valves can be closed and the other open without this necessarily leading to the perception of a fault, as in this case the consumer provided in the ring main is led through the open shut-off valve. In this context, it does not matter whether the opening that allows the consumer to be supplied in the ring main is the inlet opening or the outlet opening. The pressure difference acting on the consumer when drawing water always leads to a flow of water towards the consumer so that water can be tapped via the consumer.

Beyond this, the valves must be accessible, so that passages or inspection flaps corresponding to the number of valves must be provided for operating the respective valves. When installing the corresponding valves in apartments, the aesthetic impression of at least the area from which the shut-off valves are to be accessible is impaired.

The present invention aims to provide a drinking and domestic water system of the type mentioned introductorily, which is intended to prevent misuse as far as possible and increase the traceability of operation and, above all, installation. It is also intended to simplify the shutting off of the ring main for functional tests, cleaning measures or maintenance purposes.

In this respect, the present invention proposes to connect the outlet opening and the inlet opening as well as the ring main to a single shut-off valve. This one shut-off valve has an actuator to set valve positions. The shut-off valve is located between the outlet opening and the inlet opening and the ring main comprising the at least one consumer. No consumer is usually provided between the shut-off valve and the line. The shut-off valve connects as directly as possible to the line and the outlet and inlet openings provided there. The shut-off valve is preferably located at a point corresponding to the full-flow shut-off valves according to EP 2 167 740 A1. The shut-off valve can, for example, be realized in a structural unit with a ring main flushing valve and distributed with it. The outlet and inlet openings formed by such a ring main flushing valve are adapted in terms of their relative distances to connections on the line side, which are arranged on a housing of the shut-off valve, which accommodates the actuator and is movably mounted. A direct connection can thus be made between these line-side connections and the outlet opening or inlet opening, for example by means of fittings or screw connections assigned to each other. In this case, the actuator is set so that at least the positions known from the prior art are possible, in which the ring main can flow through the outlet opening and the inlet opening with the lowest possible flow resistance within the shut-off valve or the ring main is shut off from the line. These two valve positions can usually be realized by operating the single actuator of the shut-off valve. This simplifies handling. In addition, only one access for the shut-off valve needs to be provided from the outside, which improves the aesthetic requirements of the space allowing access to the shut-off valve. Since only a single shut-off valve needs to be operated or set by the user, suitable characterizations on the housing and/or the actuator can be used to communicate the respective operating status of the shut-off valve to the user. Misuse is thus largely ruled out. The respective operating status of the shut-off valve is immediately apparent to the user.

"Shut-off" means here that a shut-off connection within the shut-off valve is not fluidically connected to any other connection of the shut-off valve. The valve positions, as a rule all valve positions, are usually realized by positioning the single actuator of the shut-off valve and/or by handling the single actuator.

The housing of the shut-off valve usually has a first line-side connection that communicates with the outlet opening. The housing also has a second line-side connection that communicates with the inlet opening. The housing also has a first ring main-side connection and a second ring main-side connection. The ring main extends from these two ring main-side connections. In other words, the ring main is connected to the housing via the two ring main-side connections. The actuator is preferably arranged and configured in the housing in such a way that an operating position of the actuator and a bypass position of the actuator can be set. In the operating position of the actuator, a first flow path is formed in the housing, which connects the first line-side connection to the first ring main-side connection. In this operating position, a second flow path is also formed in the housing, which connects the second line-side connection to the second ring main-side connection. In the operating position, this creates a flow through the ring main with a parallel flow acting in the line, as is the case in the prior art with open full-flow shut-off valves.

With a view to ensuring that the flow through the shut-off valve is as loss-free as possible, the first flow path is preferably formed with the nominal diameter of the first line-side connection and the first ring main-side connection. The second flow path is preferably formed with the nominal diameter of the second line-side connection and the second ring main-side connection. Accordingly, a full flow through the shut-off valve is preferably made possible in the operating position.

Moreover, the actuator is preferably arranged and configured in the housing in such a way that, in a bypass position of the actuator, a first bypass path is formed in the housing, which connects the first line-side connection to the second line-side connection. The first and second ring main-side connections are shut off. Accordingly, the bypass position enables a bypass flow from the outlet opening into the inlet opening, bypassing the ring main, which is thus accessible for maintenance purposes, for example, without the entire drinking and domestic water system having to be depressurized. At normal flow velocities in the line, the flow through the bypass path is limited to less than 3 liters/ minute. The bypass position also allows water to be drawn from a consumer downstream of the ring main in the line.

In addition to the operating position and the bypass position, due to its configuration and arrangement in the housing, the actuator preferably enables further operating positions, namely a first one-sided operating position in which the first flow path is continuous and the second flow path is shut off and a second one-sided operating position in which the second flow path is continuous and the first flow path is shut off. Each of these one-sided operating positions enables functional checks and cleaning measures to be carried out within the ring main or a specific section of the ring main, as the inflowing flow can only come from one direction from the line into the ring main.

Preferably, the actuator can be arranged and configured in the housing such that, in a ring main bypass position of the actuator, a second bypass path is formed in the housing, which connects the first ring main-side connection to the second ring main-side connection. In this ring main bypass position, the first and second line-side connections are shut off. Such a ring main bypass position can be useful for the purpose of functional testing of the ring main as such or also for cleaning measures within the ring main.

The present invention enables various configurations, each of which enables a reduced installation space in one dimension. Both variants assume that the actuator is configured in a cylindrical shape and is pivotably accommodated in the housing. In the first variant, the connections and/or formations of the actuator, which form different passages between the connections depending on the position of the actuator, are arranged essentially in a plane which extends transversely to a pivot axis of the actuator. In this plane, the corresponding connections are provided distributed around the circumference of the housing. Accordingly, the housing has a relatively large ground area with a shallow depth. Depth is understood here as the extension along the pivot axis. Such a structure can be useful for a relatively thin wall that is to accommodate the shut-off valve.

For other requirements, and in particular if there is little installation space in the plane of the corresponding wall, a different structure is preferable, in which the actuator has two through holes arranged one behind the other in a direction extending along the pivot axis of the actuator, which form the first flow path or the second flow path. Alternatively or additionally, in this variant the first line-side connection can be provided behind or in front of the second line-side connection in a direction extending along the pivot axis of the actuator. A corresponding arrangement is preferably specified for the two ring main-side connections. Accordingly, the connections to the ring main or the connections to the line and/or the through holes provided to form the first or second flow path lie one behind the other in a top view of the wall corresponding to a top view of the pivot axis of the actuator. Usually, the corresponding connections or the through holes are also located strictly one behind the other in the direction of this pivot axis. Accordingly, one line-side connection is located along the pivot axis directly in front of or behind the second line-side connection. The same applies to the ring main-side connections. The line-side connections are preferably diametrically opposite the ring main-side connections so that the through holes can be recessed as straight bores within the actuator, thereby reducing the flow resistance within the shut-off valve.

According to a preferred further development of the present invention, the actuator has an expansion element which is assigned to at least one of the flow paths. This expansion element allows the flow passage through the corresponding flow path to be throttled depending on the temperature. The expansion element is exposed to the temperature of the flowing drinking and domestic water. It can therefore limit the flow through the shut-off valve depending on the temperature.

The shut-off valve is therefore also suitable for hydraulic balancing in a hot or cold water system. With several shut-off valves, each of which is assigned to a ring main, a temperature-dependent throttling to the respective ring main takes place via the expansion element depending on the temperature prevailing there. In a hot water system, the expansion element can ensure that when the water in the ring main is sufficiently warm, the flow through the corresponding ring main is increasingly throttled or this ring main is even shut off via the expansion element. In a cold water system, the expansion element can set a suitably cold temperature and, if the water temperature in the ring main is suitably cold, can increasingly restrict the flow in the ring main or even bring it to a standstill, while if the cold water temperature is too high, the expansion element opens up more and thus ensures a better exchange of the warm, presumably stale cold water so that it can be transported out of the ring main via the ring main flow.

Thus, according to a preferred further development of the present invention, a shut-off valve is also provided which is suitable for a drinking and domestic water system of the type mentioned introductorily. This shut-off valve can be arranged close to a line in order to connect a ring main leading from the line and returning to the line and to allow flow passages via the various positions.

Figure 2:
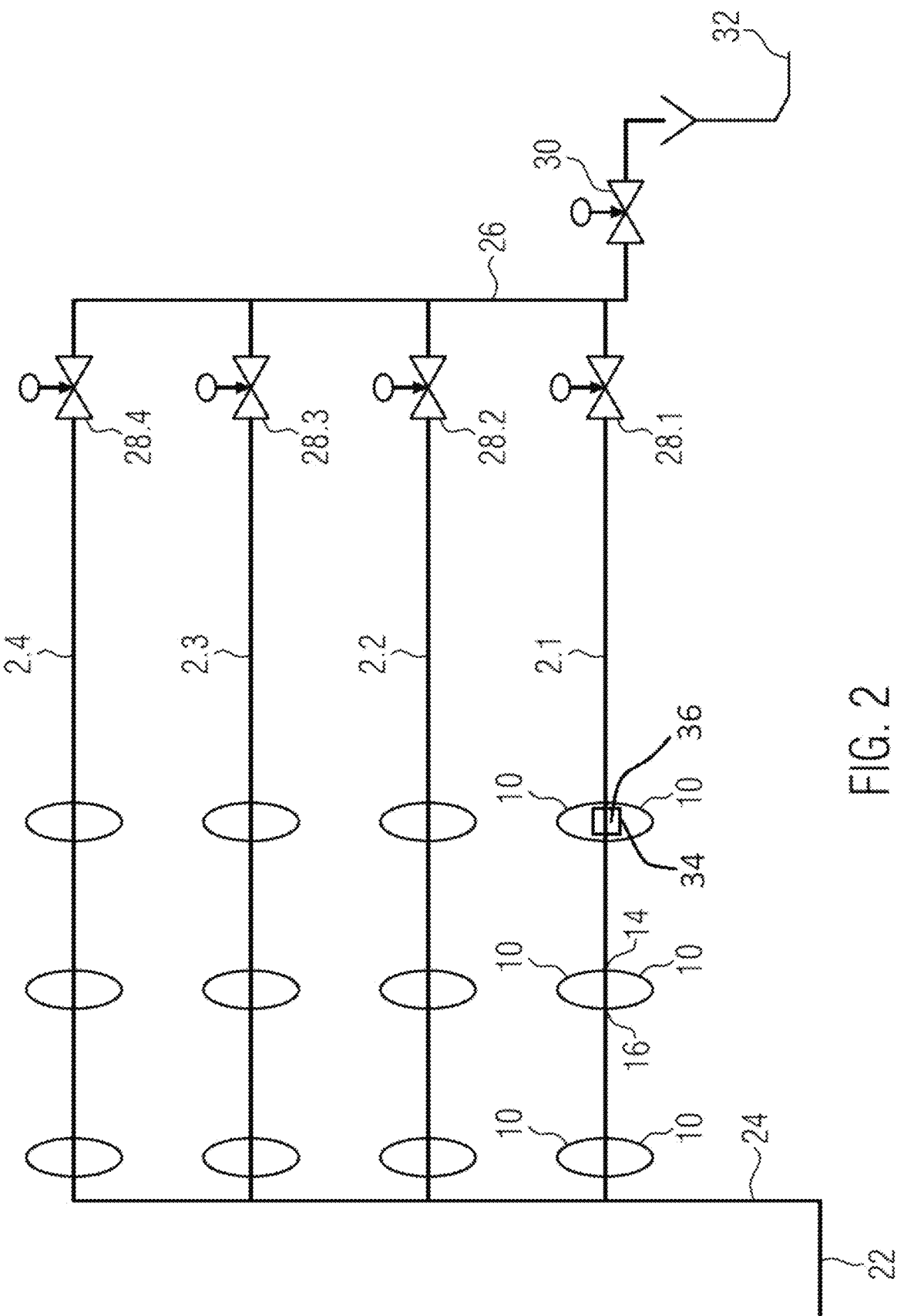
Figure 3:
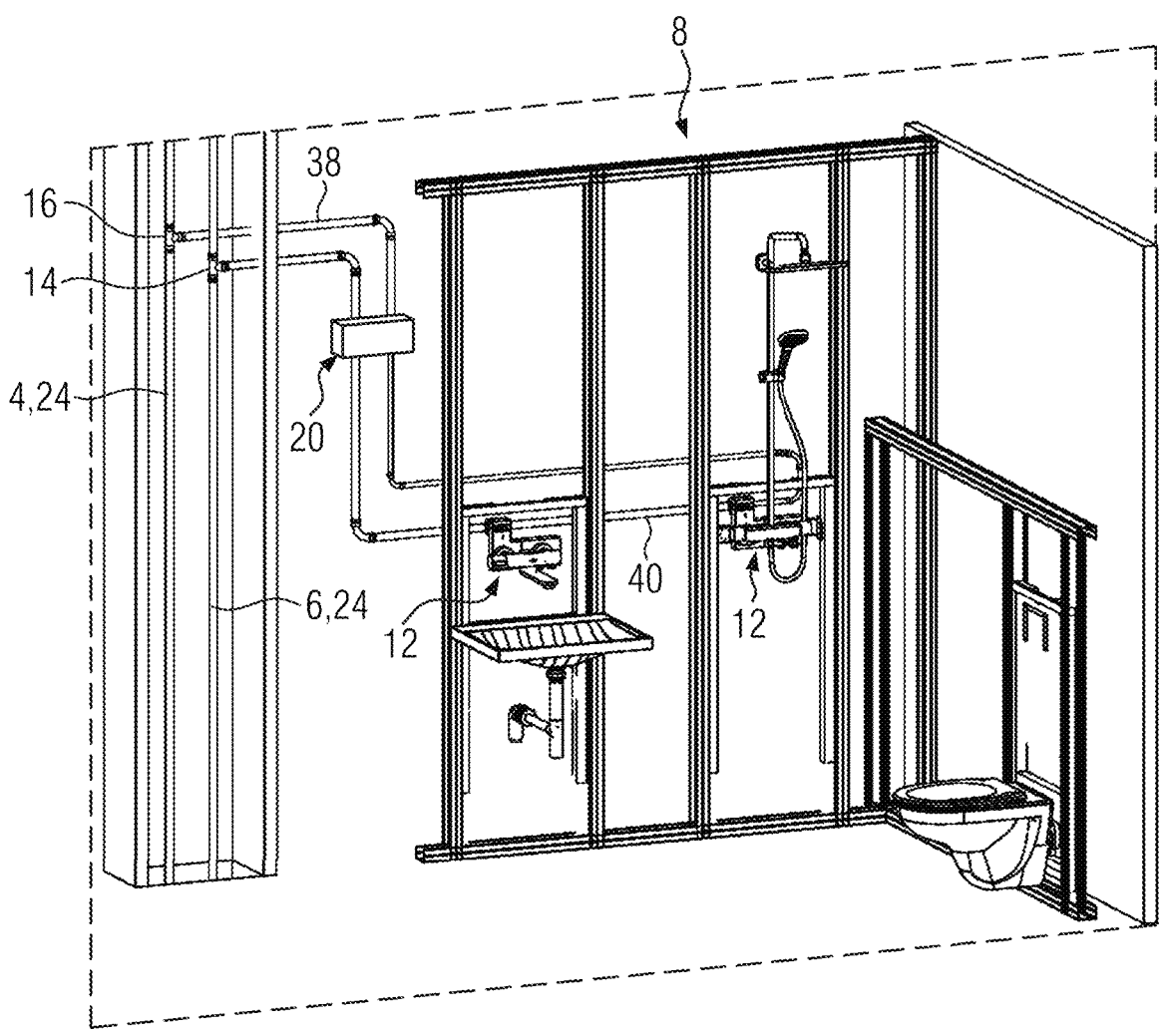
Figure 4:
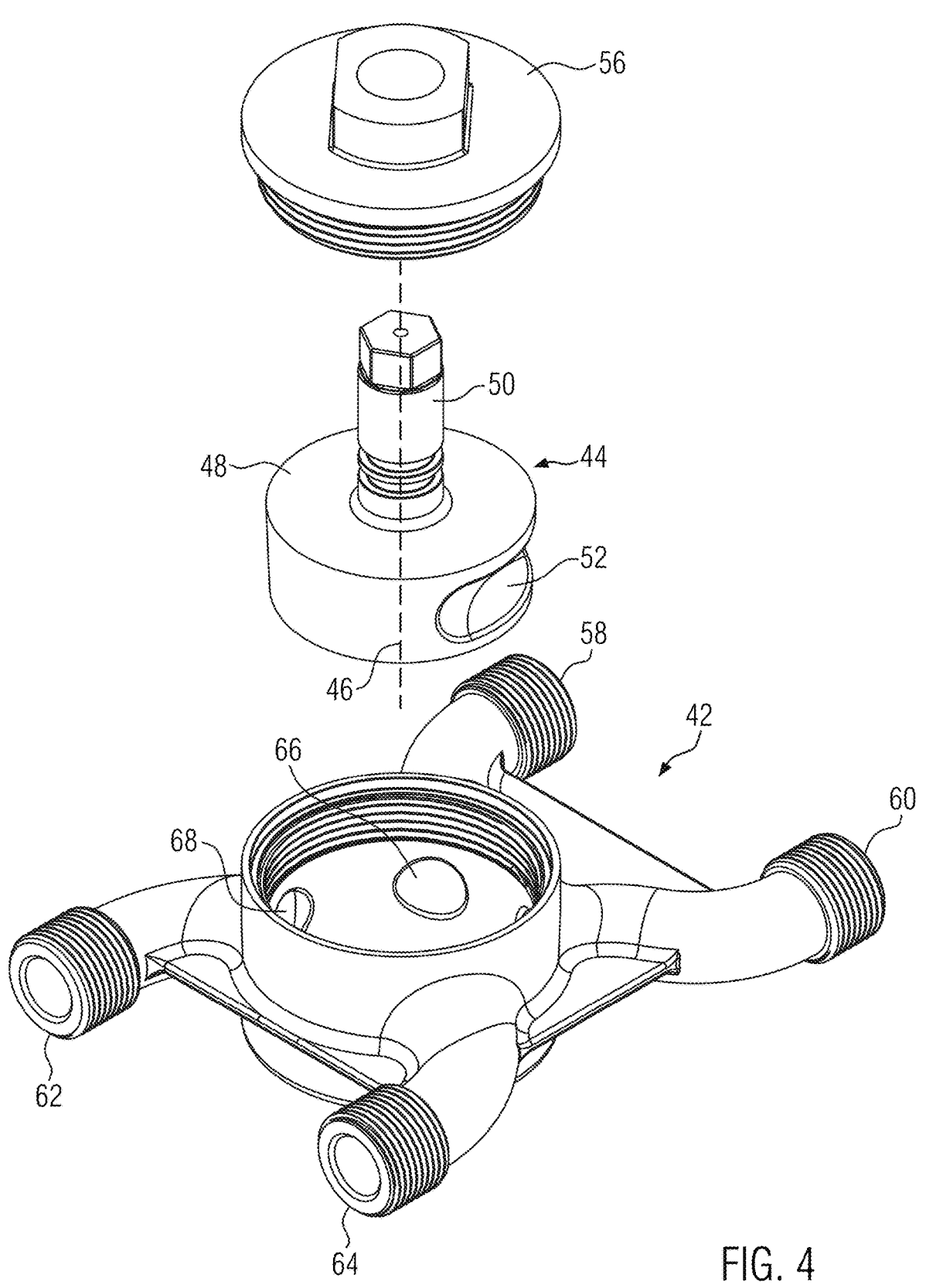

Further advantages and details of the present invention will become apparent from the following description of an embodiment in conjunction with the drawing. Therein it is shown by:

FIG. 1 a schematic view of a first embodiment of a drinking and domestic water system;

FIG. 2 a schematic representation of a second embodiment of a drinking and domestic water system, wherein only the cold water lines are shown;

FIG. 3 a section of an embodiment of a drinking and/or domestic water system, wherein only a part of the hot water supply is illustrated;

FIG. 4 an exploded view of a first embodiment of a shut-off valve;

FIGS. 5a-5d sectional views of various positions of the actuator of the embodiment shown in FIG. 4;

FIGS. 6a-6d a schematic perspective side view of a second embodiment of a shut-off valve in various positions of the actuator;

FIGS. 7a-7d sectional views of positions 6a to 6d and

Figure 7A:
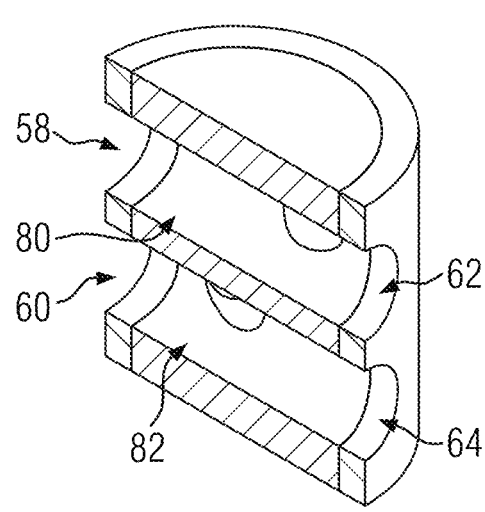
Figure 7B:
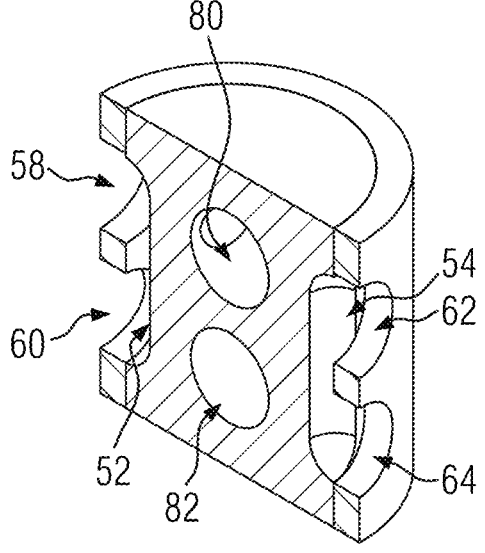
Figure 7C:
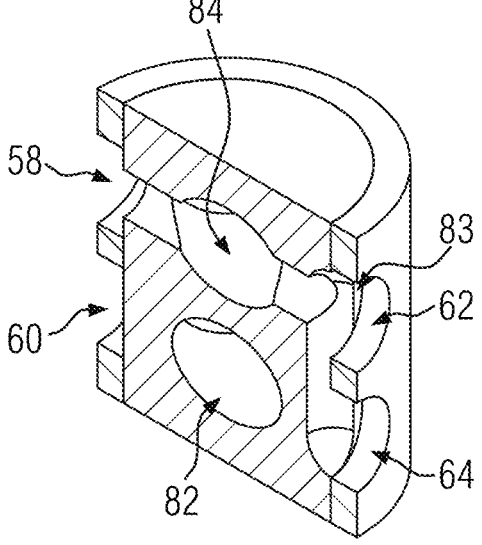
Figure 7D:
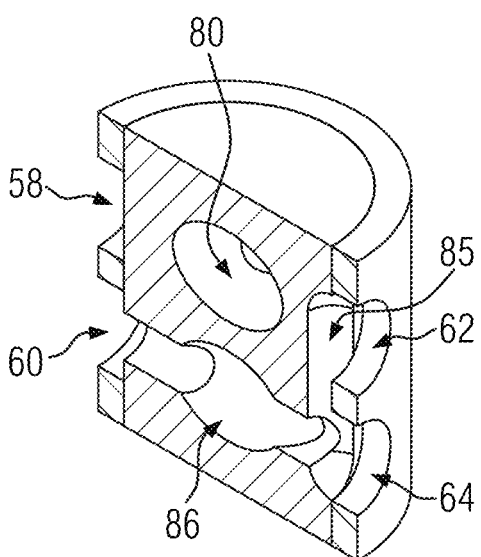
Figure 8:
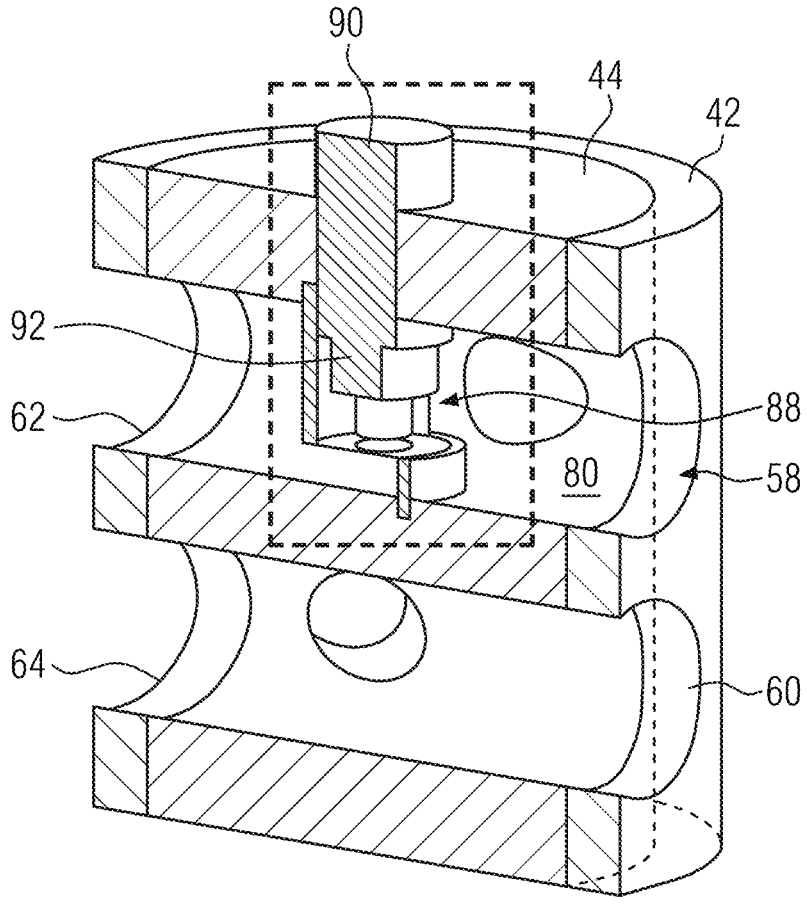

FIG. 8 a variant of the shut-off valve shown in FIGS. 7a-d in a position according to FIG. 7a with an expansion element.

The embodiment shown in FIG. 1 illustrates a drinking and domestic water installation using the example of a hotel or hospital. A cold water line 2 runs on a schematically shown floor and a hot water line 4 and a hot water circulation line 6 are provided parallel to this. Each wet room 8 has a ring main 10 for cold water, which is connected to the cold water line 2. Each ring main 10 has several consumers 12, the connections of which to the concealed embodiments shown in FIGS. 1 to 3 are characterized schematically with a dot. The consumers 12 can be a toilet, a shower, a bathtub or a hand wash basin. These consumers 12 are connected in series in the ring main 10.

The ring main 10 leaves the cold water line 2 via an outlet opening 14 and enters this line 2 via an inlet opening 16. The outlet opening 14 of each individual ring main is located upstream of the inlet opening 16 in the direction of flow (arrow S shown in the cold water line 2). Accessible from the corridor or the respective wet room 8, shut-off valves 18 are provided at the beginning of the respective ring main 10 and near the line 2, through which the connected ring main 10 can be shut off from the cold water line 2, for example to carry out assembly work on the corresponding ring main 10. The shut-off valves 20 for connecting the wet room 8 to the hot water line 4 and the hot water circulation line 6 are also located at the same point.

FIG. 2 shows the cold water lines of a drinking water system in a multi-floor building, such as a hospital. Water lines can be laid in each individual floor as shown in FIG.

1. The cold water line system has a transfer point 22 from the public drinking water supply network, a riser 24 extending in a vertical direction, from which a horizontal storey line 2 runs in each floor, a vertical connecting pipe 26, which is connected to the individual storey lines 2 via a controllable valve 28 and leads to a discharge point 32 for used water to the public waste water disposal network via a likewise controllable flushing valve 30. The individual cold water storey lines 2 run horizontally and one above the other. One line 2 is provided on each floor. In the second embodiment shown in FIG. 2, each line 2 has six ring mains 10, which depart from or return to the individual lines 2 via outlet openings 14 and inlet openings 16.

The outlet opening and the inlet opening to a single ring main 10 can be connected via a ring main flushing fitting 34, which has a flow resistance element 36 in its interior. This ring main flushing fitting 34 can be configured in accordance with EP 1 845 207 A1 or EP 2 167 740 A1.

FIG. 3 schematically shows the connection of a wet room 8 to the hot water supply and circulation. A hot water supply line 38 leads from the hot water line 4 to the last consumer 12, in this case a shower. Behind this shower, the hot water supply line 38 merges into a hot water circulation line 40 with a smaller nominal diameter than the hot water supply line 38, which opens into the hot water circulation line 6. The hot water line 4 and the hot water circulation line 6 are laid parallel to each other as vertical risers 24. In this case, the hot water line 4 leads from a hot water generator arranged in the basement. The hot water circulation line 6 leads to this hot water generator. The hot water supply line 38 and the hot water circulation line 40 form a ring main 10 within the meaning of the present invention. These lines 38, 40 are each connected to the shut-off valve 20.

The shut-off valves characterized in FIGS. 1 and 3 by reference signs 18 and 20 respectively and shown there only schematically can be configured as explained below with reference to FIG. 4 et seq.

FIG. 4 shows a housing 42 of the shut-off valve 18/20, in which an actuator 44 is pivotably mounted about a pivot axis 46. The actuator 44 has an essentially cylindrical valve body 48 and an actuating pin 50 projecting centrally from it.

As FIGS. 5a to d in particular illustrate, the valve body 48 has two formations on its outer circumferential surface in the form of concave troughs, of which only the formation referred to below as the first concave trough 52 can be recognized in FIG. 4. The other, second concave trough 54 is recognizable in FIGS. 5a to d.

The actuator 44 is accommodated in the housing 42 covered by a housing cover 56 in a pivotable and sealed manner, so that different flow passages can result within the housing 42, which will be discussed below.

In the Figures below, reference sign 58 characterizes a first line-side connection which is to be connected to the outlet opening 14. Reference sign 60 characterizes a second line-side connection which can be connected to the inlet opening 16.

Depending on the position of the actuator 44, different passages through the housing 42 of the shut-off valve 18 or 20 can be provided via these connections 58 to 64.

Figure 5A:
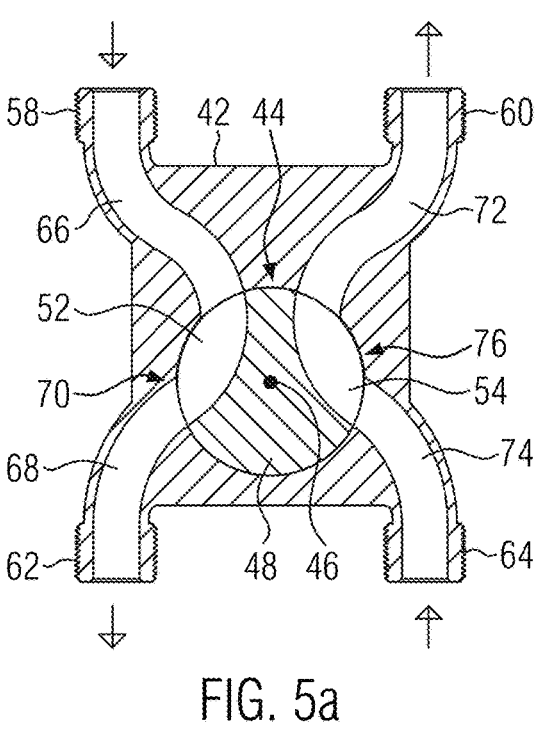

FIG. 5a illustrates the operating position. In this position, the first concave trough 52 connects flow sections 66, 68 formed in the housing 42 to form a first flow path 70 connecting the first line-side connection 58 to the first ring main-side section 62. The second concave trough 54 connects corresponding flow sections 72, 74 to form a second flow path 76. In this operating position, the ring main 10 can be flowed through with the full-flow shut-off valves open, as in the prior art. The flow sections 68, 70, 72, 74 and the two concave troughs 52, 54 are configured in such a way that the first flow path 70 and the second flow path 76 are configured with the nominal diameter of the respective connections 58, 60, 62, 64. In the present case, all connections 58, 60, 62, 64 are realized with the same nominal diameter. In the case of a shut-off valve 20 for hot water circulation, the connections 60, 64 and the second flow channel 76 connecting them can also be realized with a smaller nominal diameter, which corresponds to the nominal diameter of the hot water circulation line 40.

Figure 5C:
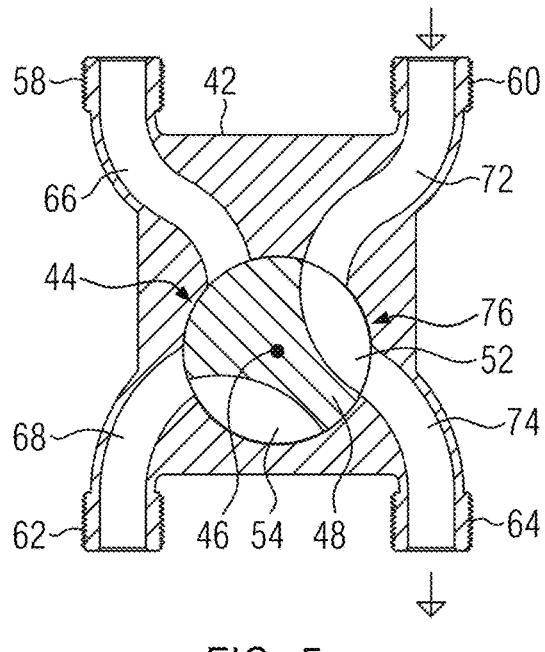
Figure 5B:
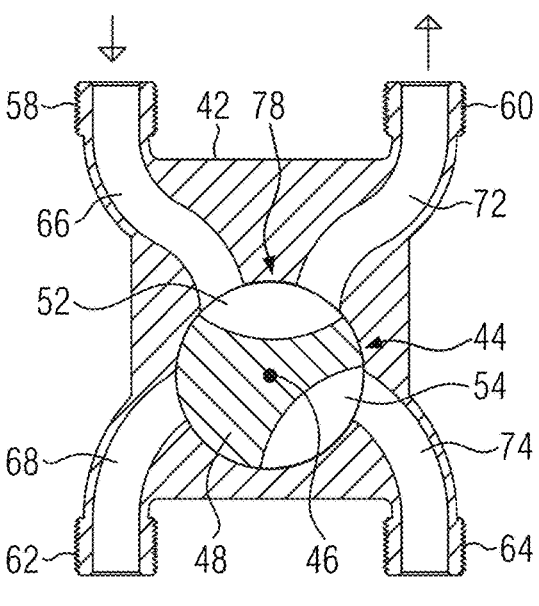
Figure 5D:
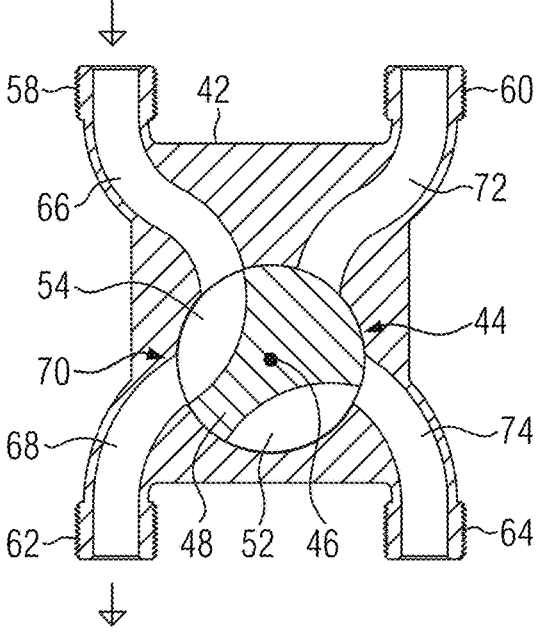

FIG. 5b illustrates a bypass position of the actuator 44. In this bypass position, the actuator 44 is pivoted approx. 80° clockwise relative to the operating position shown in FIG. 5a. The first concave trough 52 connects the flow section 66 with the flow section 72, thereby forming a first bypass path which connects the first line-side connection 58 with the second line-side connection 60. The two ring main-side connections 62, 64 are shut off by the actuator 44.

In FIG. 5c, the actuator 44 is pivoted clockwise by a further approx. 90° relative to the first bypass position shown in FIG. 5b. In the further operating position according to FIG. 5d, the actuator 44 is pivoted clockwise by a further approx. 60°. In the first one-sided operating position of the actuator 44 according to FIG. 5d, there is a continuous first flow path 70, whereas the second flow path 76 is shut off. The second line-side connection 60 and the second ring main-side connection 64 are then shut off. The operating position shown in FIG. 5c is the second one-sided operating position, in which the second flow path 76 is continuous and the first flow path 70 is shut off.

In the embodiment according to FIGS. 5a to d, all the connections 58, 60, 62, 64 and the formations 52, 54 of the actuator 44 are located on a plane which extends at right angles to the pivot axis 46.

In the embodiment shown in FIGS. 6a.1 to 6d.3, the same components are characterized by the same reference signs as in the preceding example. In a housing 42, which is also schematically reproduced cylindrically on the outer circumference, a cylindrical actuator 44 is mounted pivotably about a pivot axis 46. On the outer circumference of the housing 42, the first line-side connection 58 and the second line-side connection 60 are provided one above the other in the extension direction of the pivot axis 46 (see FIG. 6a.3). In the same way, the first ring main-side connection 62 and the second ring main-side connection 64 are provided one above the other (see FIG. 6a.1). FIG. 6a.2 shows through holes 80, 82, which are also provided one above the other in the extension direction of the pivot axis 46. In the operating position according to FIG. 6a.1 to 6a.3 and FIG. 7a, the through hole 80 is aligned with the first line-side connection 58 and the first ring main-side connection 62. The second through hole 82 is aligned with the second line-side connection 60 and with the second ring main-side connection 64. In this way, continuous first and second flow channels 70, 76 are provided. The diameters of the connections 58, 60, 62, 64 and the through holes 80, 82 are identical in the present case.

FIGS. 6b.1 to 6d.3 show the other operating positions of the actuator 44. In addition to through holes, the valve body also has troughs, some of which are shown in the Figures.

FIG. 6b.1 to 6b.3 and FIG. 7b show the bypass position of the actuator 44, in which the first line-side connection 58 is short-circuited to the second line-side connection 60 via a first concave trough 52, which is recessed on the outer circumference of the actuator 44. FIG. 6b.1 shows a short circuit of the first ring main-side connection 62 with the second ring main-side connection 64 via a second concave trough 54. Thus, FIG. 6b shows the bypass position of the actuator 44 as well as the ring main bypass position of the actuator 44, which is realized in the present case with a single position of the actuator 44.

FIGS. 6c.1 to 6c.3 and FIG. 7c illustrate the first one-sided operating position of the actuator 44, in which the first line-side connection 58 and the second line-side connection 62 communicate with each other via a transverse bore 84 within the actuator 44, while the respective second connections 60, 64 are routed through the actuator 44. The second line-side connection 62 and the second ring main-side connection 64 communicate with each other via a third concave trough 83, so that the second ring main-side connection 64 also communicates with the first line-side connection 58 via the transverse bore 84.

The reverse case configuration is shown in FIGS. 6d.1 to 6d.3, wherein the flow passage through the actuator 44 is effected by a transverse bore 86 passing through the actuator 44. The transverse bores 84, 86 have a smaller diameter than the through holes 80 and 82 respectively.

In all of FIGS. 6a.1 to 6d.3 and FIG. 7d, markings MG for the housing 42 and MS for the actuator 44 are shown on the upper end face of the housing 42 and the actuator 44. These illustrate the pivot path from the operating position shown in FIG. 6a to the other valve positions shown in FIGS. 6b, 6c and 6d. The first ring main-side connection 62 and the second ring main-side connection 64 communicate with each other via a fourth concave trough 85, so that the first ring main-side connection 62 also communicates with the second line-side connection 60 via the transverse bore 86.

FIG. 8 shows a variant of the embodiment according to FIGS. 6 and 7. In this configuration, an expansion element 88 is provided in the flow passage 80, which sets a valve body 90 which interacts with a valve seat 92 provided within the through hole 80 and the actuator 44. The expansion element 88 can be installed in the area of the supply line 38 to cover the water tapping or in the circulation line 40.

LIST OF REFERENCE SIGNS 2 cold water line
4 hot water line
6 hot water circulation line
8 wet room
10 ring main
12 consumer
14 outlet opening
16 inlet opening
18 shut-off valve (TWC)
20 shut-off valve (TWW)
22 transfer point
24 riser
26 connecting pipe
28 valve
30 flushing valve
32 tapping point
34 ring main flushing fitting
36 flow resistance element
38 hot water supply line
40 hot water circulation line
42 housing
44 actuator
46 pivot axis
48 valve body
50 actuating pin
52 first concave trough

9

54 second concave trough
56 housing cover
58 first line-side connection
60 second line-side connection
62 first ring main-side connection
64 second ring main-side connection
66 flow sections
68 flow sections
70 first flow path
72 flow sections
74 flow sections
76 second flow path
78 bypass path
80 through hole
82 through hole
83 third concave trough
84 transverse bore
85 fourth concave trough
86 transverse bore
88 expansion element
90 valve body
92 valve seat

The invention claimed is:

1. Drinking and domestic water system with a transfer point (22) from a public water supply network, a line (2, 4) from which at least one ring main (10; 38, 40) provided with at least one consumer (12) branches off, wherein the ring main (10) branches off from the line (2, 4) via an outlet opening (14) and is led back into the line (2, 4) via an inlet opening (16), wherein the line (2, 4) and the ring main (10) are led in parallel and a flow resistance element (36) is arranged in the line (2, 4) between the outlet opening (14) and the inlet opening (16), or wherein the ring main (38, 40) is led back into a circulation line (6) via the inlet opening (16), wherein a single shut-off valve (18, 20) which has an actuator (44) and is arranged between the outlet opening (14) or the inlet opening (16) and the ring main (10) provided with the at least one consumer (12), and wherein the outlet opening (14), the inlet opening (16) and the ring main (10) are connected to said single shut-off valve.

2. Drinking and domestic water system according to claim 1, characterized in that the shut-off valve (18, 20) has a housing (42) which has a first line-side connection (58) which communicates with the outlet opening (14), a second line-side connection (60) which communicates with the inlet opening (16), a first ring main-side connection (62) and a second ring main-side connection (64), wherein the ring main (10; 38, 40) is connected to the housing (42) via the ring main-side connections (62, 64), and the actuator (44) is arranged and formed in the housing (42) such that
    in an operating position of the actuator (44), a first flow path (70) is formed in the housing (42), which connects the first line-side connection (58) to the first ring main-side connection (62), and a second flow path (76) is formed, which connects the second line-side connection (60) to the second ring main-side connection (64);
    in a bypass position of the actuator (44), a first bypass path (78) is formed in the housing (42), which connects the first line-side connection (58) to the second line-side connection (60) and the first ring main-side connection (62) and the second ring main-side connection (64) are shut off.

3. Drinking and domestic water system according to claim 2, characterized in that the actuator (44) is arranged and formed in the housing (42) such that

10 in a first one-sided operating position of the actuator (44), the first flow path (70) is continuous and the second flow path (76) is shut off, and
    in a second one-sided operating position of the actuator (44), the second flow path (76) is continuous and the first flow path (70) is shut off.

4. Drinking and domestic water system according to one of claims 2 to 3, characterized in that the actuator (44) is of cylindrical shape and is pivotably accommodated in the housing (44), and in that the connections (58, 60, 62, 64) and/or formations of the actuator (44), which form different passages between the connections (58, 60, 62, 64) depending on the position of the actuator (44), are arranged essentially in a plane extending transversely to a pivot axis (46) of the actuator (44).

5. Drinking and domestic water system according to claim 2, characterized in that the actuator (44) is of cylindrical shape and is pivotably accommodated in the housing (42), and in that the actuator (44) has two through holes (80) arranged one behind the other in a direction extending along the pivot axis (46) of the actuator (44), which through holes form the first flow path (70) or the second flow path (76) and/or in that the first line-side connection (58) and the second line-side connection (60) and/or that the first ring main-side connection (62) and the second ring main-side connection (64) are arranged one behind the other in a direction extending along the pivot axis (46) of the actuator (44).

6. Drinking and domestic water system according to claim 2, characterized in that the actuator (44) has an expansion element (88) which is assigned to at least one of the flow paths (70; 76) and by means of which the flow passage through the corresponding flow path (70, 76) can be throttled depending on the temperature.

7. Drinking and domestic water system according to claim 2, characterized in that the first flow path (70) is formed with the nominal diameter of the first line-side connection and the first ring main-side connection (58; 62) and the second flow path (76) is formed with the nominal diameter of the second line-side connection and the second ring main-side connection (60; 64).

8. Shut-off valve for a drinking and domestic water system according to claim 2, comprising a housing (42) having a first line-side connection (58) communicating with the outlet opening (14), a second line-side connection (60) communicating with the inlet opening (16), a first ring main-side connection (62) and a second ring main-side connection (64), and an actuator (44) arranged and formed in the housing (42) such that
    in an operating position of the actuator (44), a first flow path (70) is formed in the housing (42), which connects the first line-side connection (58) to the first ring main-side connection (62), and a second flow path (76) is formed, which connects the second line-side connection (60) to the second ring main-side connection (64);
    in a bypass position of the actuator (44), a first bypass path (78) is formed in the housing (42), which connects the first line-side connection (58) to the second line-side connection (60) and the first and second ring main-side connections (62; 64) are shut off.

9. Shut-off valve according to claim 8, characterized in that the actuator (44) has an expansion element (88) assigned to at least one of the flow paths (70; 76), by means of which the flow passage through the corresponding flow path (70, 76) can be throttled depending on the temperature.

10. Shut-off valve according to claim 8 or 9, characterized in that the first flow path (70) is formed with the nominal diameter of the first line-side and the first ring main-side connection (58; 62) and the second flow path (76) is formed with the nominal diameter of the second line-side and the second ring main-side connection (60; 64).

11. Shut-off valve according to claim 8, wherein:

in a first one-sided operating position of the actuator (44), the first flow path (70) is continuous and the second flow path (76) is shut off, and in a second one-sided operating position of the actuator (44), the second flow path (76) is continuous and the first flow path (70) is shut off.

12. Shut-off valve according to claim 8, wherein in a ring main bypass position of the actuator (44), a second bypass path (78) is formed in the housing (42), which connects the first ring main-side connection (62) to the second ring main-side connection (64), and the first and second line-side connections (58; 60) are shut off.

\* \* \* \* \*